United States Patent [19]

Thode

[11] 4,348,604
[45] Sep. 7, 1982

[54] TOTALLY ENCLOSED AIR COOLED ELECTRICAL MACHINES

[75] Inventor: Herbert W. Thode, Oradell, N.J.

[73] Assignee: General Dynamics Corp., St. Louis, Mo.

[21] Appl. No.: 159,408

[22] Filed: Jun. 13, 1980

[51] Int. Cl.³ ............................................. H02K 9/00
[52] U.S. Cl. ...................................... 310/62; 310/59; 165/166
[58] Field of Search ...................... 310/55, 56, 57, 58, 310/59, 60 R, 60 A, 62, 63, 64, 65, 67 R; 165/166, 64, 61; 174/15 R

[56] References Cited

U.S. PATENT DOCUMENTS

| | | | |
|---|---|---|---|
| 2,789,238 | 4/1957 | Staak | 310/57 |
| 2,887,593 | 5/1959 | Wiedemann | 310/59 |
| 3,113,227 | 12/1963 | Bromberger et al. | 310/55 |
| 3,751,699 | 8/1973 | Gleichman | 310/58 |
| 4,042,018 | 8/1977 | Zebuhr | 165/166 |
| 4,071,791 | 1/1978 | Armor et al. | 310/65 |
| 4,119,873 | 10/1978 | Sakurai | 310/62 |
| 4,130,160 | 12/1978 | Dziedzic et al. | 165/166 |
| 4,233,533 | 11/1980 | Lown | 310/59 |
| 4,246,503 | 1/1981 | Fujioka et al. | 310/59 |
| 4,306,165 | 12/1981 | Kitabayashi et al. | 310/59 |

*Primary Examiner*—A. T. Grimley
*Assistant Examiner*—D. L. Rebsch
*Attorney, Agent, or Firm*—Martin LuKacher

[57] ABSTRACT

A totally enclosed electrical machine, particularly a high power electric motor, is provided with a plate-type, crossflow, air-to-air heat exchanger which is seated on the frame of the electrical machine. Adjacent plates of the heat exchanger are modular units which define an array of ducts through which the internal air heated by the machine flows in a direction away from the machine. The ducts at opposite ends of the array provide passages for the bi-directional flow of air, such that air which is cooled in the heat exchanger is returned to the opposite ends of the machine. The heat exchanger is provided with a plenum in which air is returned to the end ducts. A baffle in the plenum distributes the air in different amounts, which vary progressively but in opposite senses, to the return ducts which communicate with the opposite ends of the machine thereby equalizing the temperature of the return air supplied to the opposite ends of the machine and providing uniform cooling of the machine. External air is directed through channels between adjacent plates of the heat exchanger, the opposite sides of which define the ducts for the internal machine air. The entire unit can readily be assembled at low cost.

21 Claims, 11 Drawing Figures

TOTALLY ENCLOSED AIR COOLED ELECTRICAL MACHINES

DESCRIPTION

The present invention relates to electrical machinery and particularly to electrodynamic machines, such as motors and generators through which air is circulated for the purpose of cooling so as to enable the machine to have a higher power rating than would otherwise be the case.

The invention is especially suitable for use in totally enclosed air-to-air cooled electrical machinery, particularly high power electrical motors from 300 to 3,000 horsepower ratings and higher.

Air is most suitably used as the cooling medium. Other fluid media may be used which are preferably gaseous. The term "air" as used herein should be taken to include such other fluid media.

Totally enclosed electrical machinery are used in many industrial applications where environmental conditions militate against direct cooling with external air. Typically, the electrical machine is provided with an array of tubes through which the external air passes and around which the internal air of the machine is circulated so as to cool the external air. Uniform cooling of the machine is difficult to accomplish by means of such tube-type heat exchangers and one end of the machine is usually much hotter than the other. In some cases, refrigerant is circulated through the tubes to increase the cooling capacity. In other implementations, the tubes entirely surround the machine in an effort to provide increased cooling capacity. Tube-type cooling means are also difficult to construct in that they require special supporting frameworks. Electrical machinery with tube-type heat exchangers therefore tend to be expensive. Reference may be had to the following United States patents which show various types of totally enclosed electrical machines with heat exchangers of the tube type: U.S. Pat. Nos. 1,386,934, issued Aug. 9, 1921; 1,405,616, issued Feb. 7, 1922; 2,324,297, issued July 13, 1943; 3,502,916, issued Mar. 24, 1970; 2,536,815, issued Jan. 2, 1951; and 3,441,758, issued Apr. 29, 1969.

Air-to-air heat exchangers, other than tube-type heat exchangers, have been described. Such heat exchangers are not adapted for use with totally enclosed electrical machinery so as to provide the uniform cooling essential for the operation of such machinery. Reference may be had to the following United States patents which show plate-type air-to-air heat exchangers which have been provided for purposes other than the cooling of electrical machinery: U.S. Pat Nos.

2,285,225, issued June 2, 1942;
2,828,947, issued Apr. 1, 1958;
2,869,835, issued Jan. 20, 1959;
3,176,73, issued Apr. 6, 1965;
3,262,496, issued July 26, 1966;
3,310,105, issued Mar. 21, 1967;
3,613,782, issued Oct. 19, 1971;
3,860,065, issued Jan. 14, 1975;
3,986,549, issued Oct. 19, 1976;
4,073,340, issued Feb. 14, 1978;
4,095,349, issued June 20, 1978.

Accordingly, it is an object of the present invention to provide improved electrical machinery, particularly electrical machinery of the totally enclosed air cooled type.

A further object of the present invention is to provide improved electrical machinery in which heat transfer is accomplished efficiently, effectively and at lower cost than has heretofore been the case.

It is a still further object of the present invention to provide an improved totally enclosed air-to-air cooled electrical machine in which cooled air is circulated in a manner to provide uniform cooling of the machine at low cost.

It is a still further object of the invention to provide a totally enclosed air cooled machine in which both ends of the machine and even the bearings which support the shaft thereof are uniformly cooled.

It is a still further object of the present invention to provide an improved air-to-air heat exchanger of the plate type.

It is a still further object of the present invention to provide a improved air-to-air heat exchanger which may be fabricated essentially from sheet metal and without tubes or special supporting structures.

It is a still further object of the present invention to provide an improved air-to-air heat exchanger of modularized construction which may be readily assembled at low cost.

Briefly described, an enclosed air cooled, electrodynamic machine embodying the invention has a frame which houses the machine and may support the bearings of the machine. The frame is open on one side thereof on which is seated a crossflow plate heat exchanger. Between alternate pairs of the plates of the heat exchanger, there are formed as by partitions which are part of separate modules of the heat exchanger which include the plates, an array of ducts. The ducts at the opposite ends of the array communicate with the ends of the machine and preferably also with the region in the frame around the bearings which support the shaft of the machine. The central ducts, which are located between these end ducts, provide a path for internal air from the machine. Means are provided for directing the air from these central ducts to the end ducts such that the air returned to the opposite ends of the machine through the end ducts is approximately of equal temperature. The machine is therefore cooled uniformly as the return air passes therethrough. Channels between the plates which define the ducts carry external air which may flow from end to end through the heat exchanger.

The foregoing and other objects, features and advantages of the invention as well as a presently preferred embodiment thereof will become more apparent from a reading of the following description in connection with the accompanying drawings in which.

Figure 1:
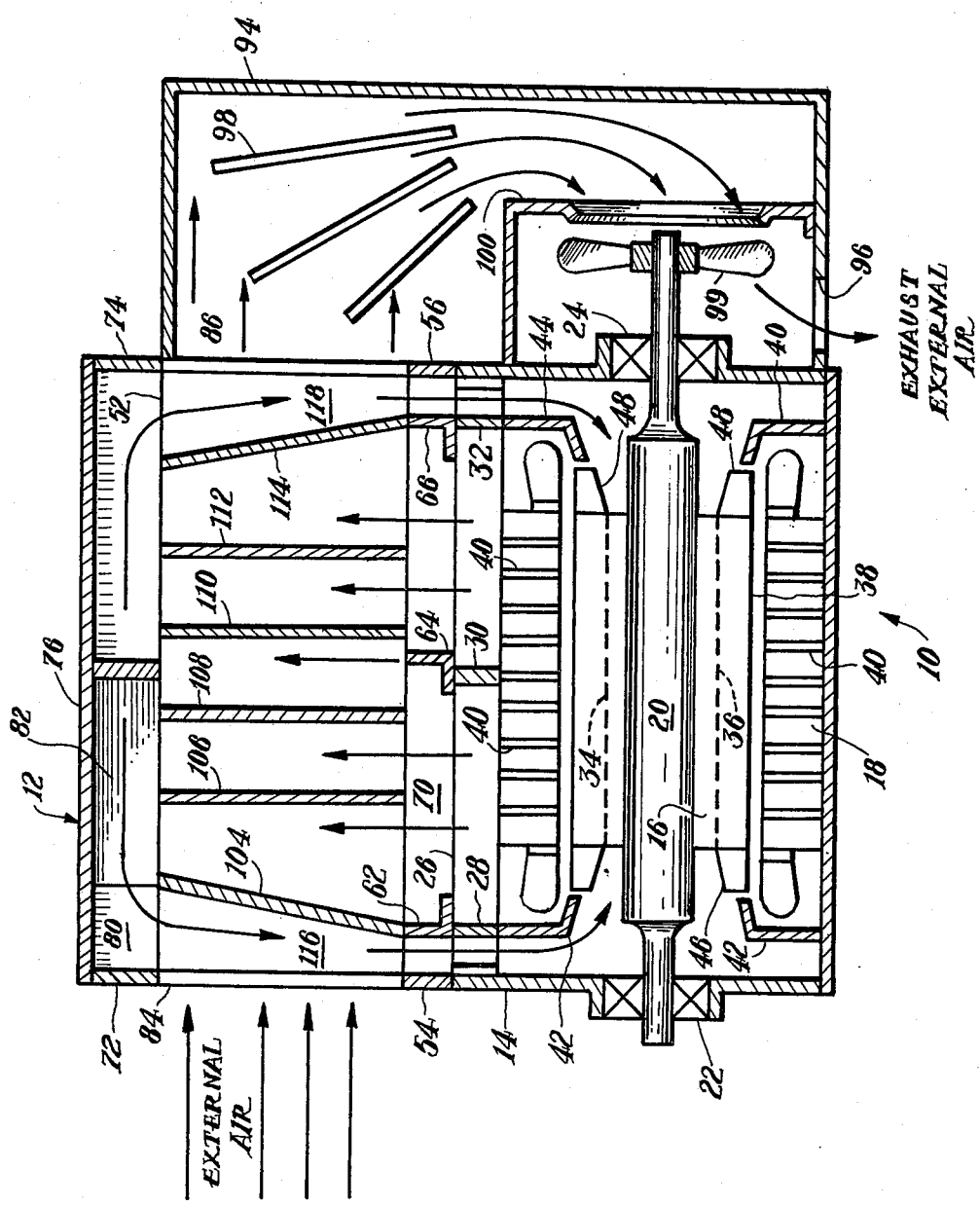
FIG. 1 is a simplified sectional view illustrating the presently preferred embodiment of the invention, namely a totally enclosed electric motor having an air-to-air heat exchanger.
Figure 2:
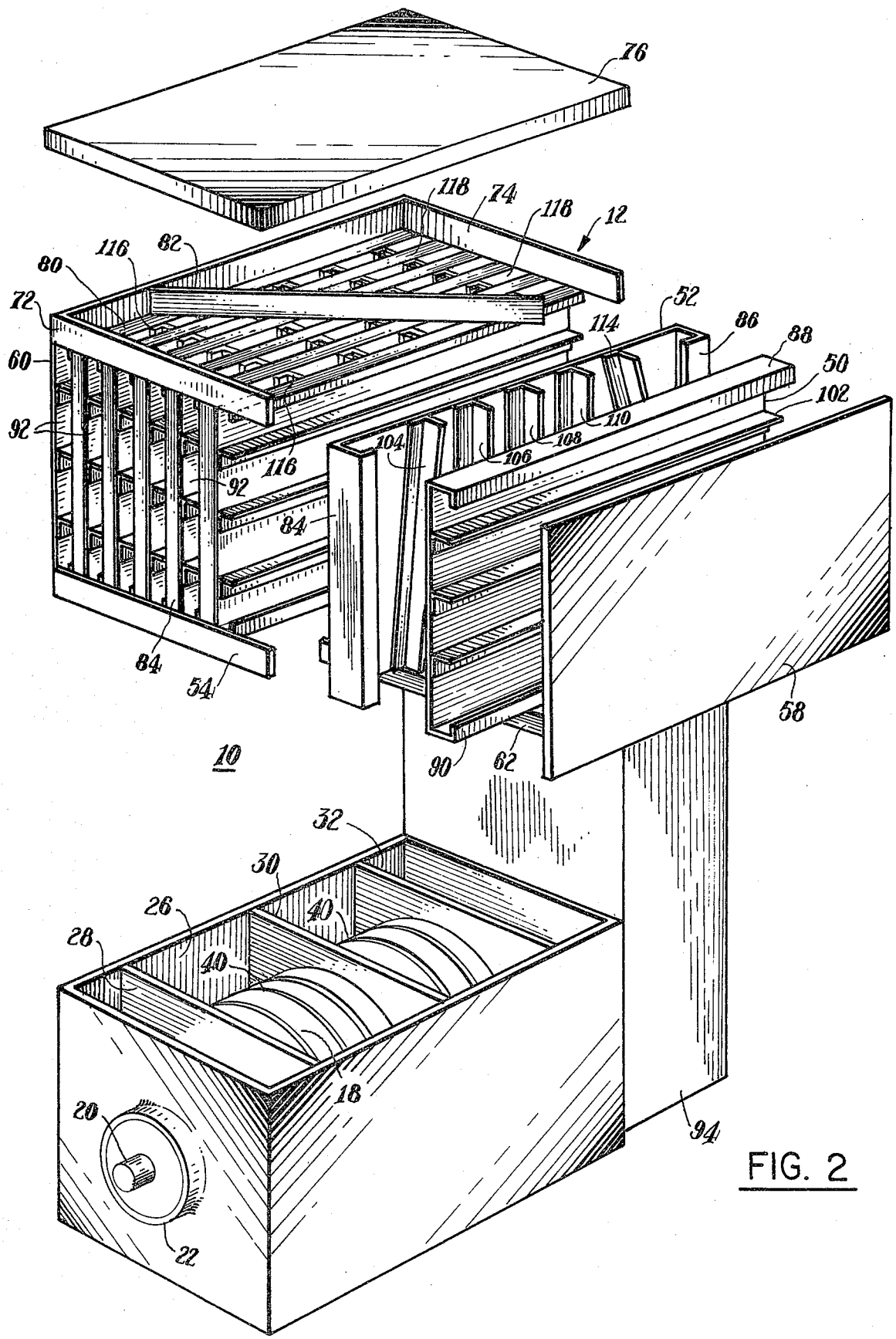
FIG. 2 is a simplified exploded view of the heat exchanger shown in FIG. 1.

Referring more particularly to FIGS. 1 and 2, there is shown a totally enclosed electrical motor 10. This motor may suitably be provided with high horse power ratings from 300 to 3,000 horse power and more. These high ratings are obtainable within a relatively small space by reason of the heat exchanger unit 12 which forms part of the motor 10. It will be appreciated the motor 10 is a preferred embodiment of the invention and that the invention may be used to provide other electrical machinery in order to increase the power handling capacity thereof.

A frame 14 houses the rotor 16 and stator 18 of the motor. The shaft 20 on which the rotor is mounted is journaled in bearings 22 and 24 in opposite end walls of the frame 14. The top wall or side 26 of the frame 14 is open; the other walls being closed. Struts 28, 30 and 32 extend laterally across the top side 26 and serve to direct the flow of internal machine air with respect to the frame 14 of the motor so that the rotor and stator are uniformly cooled by circulation of return air from the heat exchanger unit 12 to the opposite ends of the motor (double-ended ventilation).

The exemplary motor shown in FIG. 1 is of the squirrel cage type. The rotor 16 is assembled from laminations onto the shaft 20. These laminations may have axial holes therethrough immediately adjacent the periphery of the shaft as well as radial holes so as to permit the circulation of air from the ends of the motor through the rotor and into the gap 38 between the rotor and the stator. The stator may have radial slots 40 through which the air from the gap passes upwardly from the central portion of the motor (viz. the entire stator region) through the open top side 26 of the frame into the heat exchanger. The circulation of the return internal air is directed by the baffles 42 and 44 in the end regions of the frame 14. These baffles are disposed near the end walls of the frame so as to direct the return air, which has been cooled in the heat exchanger unit 12, also into the vicinity of the bearings 22 and 24 so as to maintain them cool as well as the rotor 16 and stator 18 of the motor. The circulation of the return air is assisted by blades 46 and 48, a plurality of which are attached to each end of the rotor. These blades direct the air into the gap 38 between the rotor 16 and stator 18 whence the air circulates through the slots 40 and carries the motor heat upwardly into the heat exchanger 12.

The heat exchanger unit 12 is a crossflow plate type heat exchanger made up of individual plate modules 50 and 52 which are stacked together to form a rectilinear structure. The modules are housed in a frame made up of bottom end members 54 and 56, which are L-shaped struts as shown in detail in FIG. 4. The housing also includes side plates 58 and 60. Three angle irons 62, 64 and 66, which extend laterally between the side plates 58 and 60, are disposed in alignment with the struts 28, 30 and 32 and support the modules 50 and 52. Passages for the return air from the heat exchanger are defined between the end walls 54 and 56 and their adjacent angle irons 62 and 66. These passages communicate with the passages formed by the struts 28 and 32 and the baffles 42 and 44 which are attached thereto. The return air flow is therefore directed to the opposite end regions of the motor frame 14. A bottom plenum 70 is defined between the angle irons 62 and 66 and the side plates 58 and 60 for distributing the heated internal air from the central portion of the machine (viz. the stator 18 thereof) into the heat exchanger unit 12. By increasing the height of the end members 54 and 56 and the angle irons 62, 64 and 66. The height and volume of this plenum 70 may be increased for better distribution of the internal air, if desired.

The side plates 58 and 60 extend vertically beyond the upper sides of the modules 52 and 54. Top end members 72 and 74 and the side plates 58 and 60 form a rectilinear (rectangular) chamber at the top of the modules which is closed by a cover 76. This chamber defines a top plenum 80. A baffle plate 82 extends laterally across the plenum 80 at a predetermined angle to the plates. This baffle serves to divert and divide the air which passes through the heat exchanger from the central portion of the machine in a progressive manner and to return the air in such proportional relationship to the opposite ends of the machine that these ends receive air cooled to about equal temperatures. The cooling of the motor is therefore uniform and avoids hot spots in the bearings, rotor and stator.

Between the end members 54 and 72 and the side plates 58 and 60 at the left end of the machine as viewed in FIGS. 1 and 2, the heat exchanger 12 is open to provide an entry or inlet for the external air. The modules 52 which are disposed alternately with the modules 50 across the width of the heat exchanger unit 12 between the side plates 58 and 60 have folded sections 84 and 86 at the opposite ends thereof. The other modules 50 have folded sections 88 and 90 at the top and bottom sides thereof. The modules when stacked together, therefore define interleaved alternate vertical and horizontal channels through the heat exchanger. The horizontal channels 92 carry the external air. These horizontal channels 92 are open on the right side of the machine, as viewed in FIGS. 1 and 2, in a manner similar to that in which they are open at the left side of the machine to provide an exit for the external air.

An enclosure or housing 94 covers the exit openings of the channels 92 on the right side of the machine and extends downwardly to level just above the floor of the machine where a vent opening 96 is located. External air is drawn through the channels 92 by a fan 99 attached to the end of the shaft 20. The external air is directed through the enclosure into the fan by an arrangement of baffles 98 and 100. Inasmuch as the fan 99 is located after the heat exchanger in the direction of flow of the external air, any temperature rise due to the action of the fan does not increase the external air temperature and does not lower the cooling effect of the external air as might be the case if the fan was used to blow external air into the heat exchanger channels 92.

Each of the modules 50 and 52 has attached thereto, as by spot welding, L-shaped partitions. Some of these partitions are located on opposite sides of the plates of adjacent modules 50 and 52 so that when assembled together they provide passages or ducts. The partitions 102 and the folded sections 88 and 90 which are horizontal are located in the channels 92 and provide horizontal ducts for guiding external air through the heat exchanger. The partitions 104, 106, 108, 110, 112 and 114 which are vertical and the folded sections 84 and 86, most of which are on the modules 52 define vertical ducts between alternate pairs of the plates in the heat exchanger unit 12. End or first ducts 116 and 118 between the folded sections 84 and 86 their adjacent partitions 104 and 114 carry the return air back to the opposite ends of the motor. The ducts between the partitions 104, 108, 109, 110 and 114 are central or second ducts and carry the internal air upwardly from the central portion of the motor 10. It will be observed that the terms "vertical" and "horizontal" as used herein are exemplary of the preferred manner in which the heat exchanger is located on top of the motor frame. It will be appreciated that the heat exchanger may be located on either opposite side of the motor frame and that a side wall may, instead, be the open wall. It will be appreciated that the heat exchanger can be located on the side of the motor frame. The channels and ducts which are horizontal will then be vertical, and conversely, the channels and ducts which are shown to be vertical in the drawings will be horizontally disposed. Accordingly, the terms "horizontal" and "vertical," although apt to describe the preferred embodiment of the invention, should be taken to mean perpendicularly disposed directions.

The stacked relationship of the plates of the modules 50 and 52 provide an array of ducts. The end ducts 116 and 118 are in rows at opposite ends of the array while the central ducts are disposed in the rows of the array between them. The array is essentially rectilinear as viewed from the top of the heat exchanger. The baffle 82 extends at an oblique angle to the plates, which cuts across the central rows of ducts, as best observed in FIG. 3. The baffle 82 extends between the end row ducts 116 and 118 in opposite corners of the array. The arrangement divides the heated air from the central portion of the machine in top plenum 80 so that it is returned in oppositely directed flow paths in the top plenum 80 to the end row ducts 116 and 118. The oblique orientation of the baffle 82 diagonally across the array distributes the air flow volume in opposite relationship or sense to the opposite end row ducts 116 and 118. The flow distribution varies progressively in the lateral direction between the side plates 58 and 60, because of the diagonal orientation of the baffle 82. The flow of the internal air varies progressively in one sense across the row of ducts 116 at the left end of the heat exchanger and in the opposite sense ends across the row of ducts 118 on the right end of the heat exchanger. Because of this flow direction and distribution, the temperatures of the return air is equalized thereby affording uniform cooling of the motor as the air is distributed to the opposite end portions of the machine.

The heat exchanger unit 12 may be made entirely of sheet metal. The modules may be made of aluminized steel such as used in the construction of automobile mufflers. It is necessary merely to stack the modules to provide the entire heat exchanger unit 12. Individual modules need not be brazed or welded together. Because of the absence of complexity and the need of any labor intensive assembly processes, the entire machine may be fabricated at low manufacturing costs.

Figure 3:
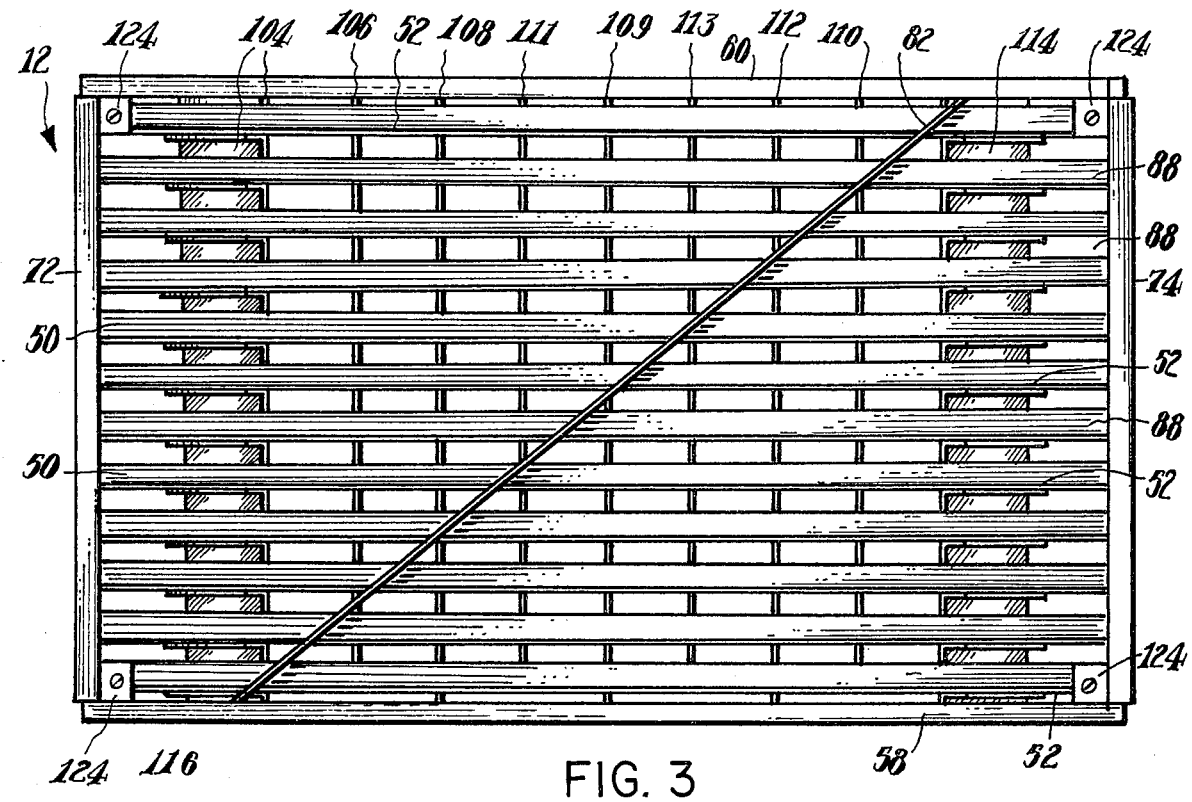
FIG. 3 is a plan view, showing in greater detail the top of the heat exchanger of the totally enclosed electric motor of the type shown in FIGS. 1 and 2 with the cover removed.
Figure 4:
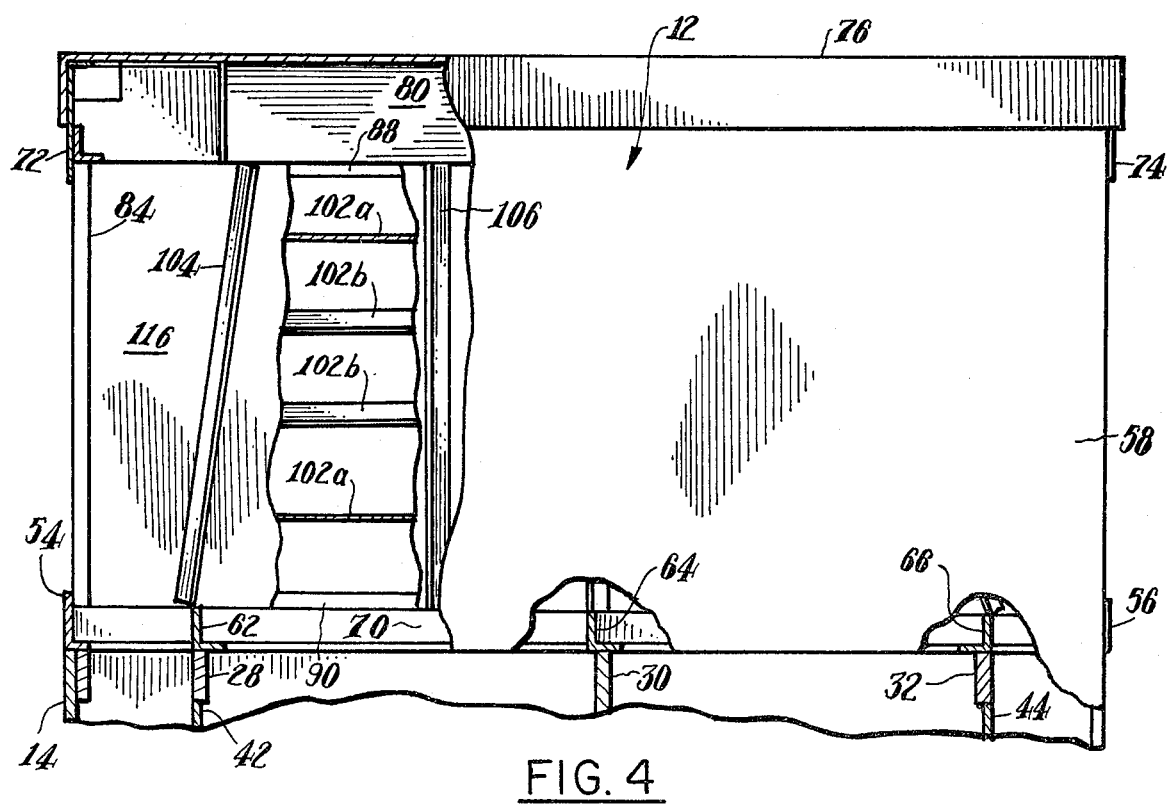
FIG. 4 is a fragmentary elevational view of the machine shown in FIG. 3, the view being partially broken away to illustrate the internal construction of the heat exchanger thereof.
Figure 5:
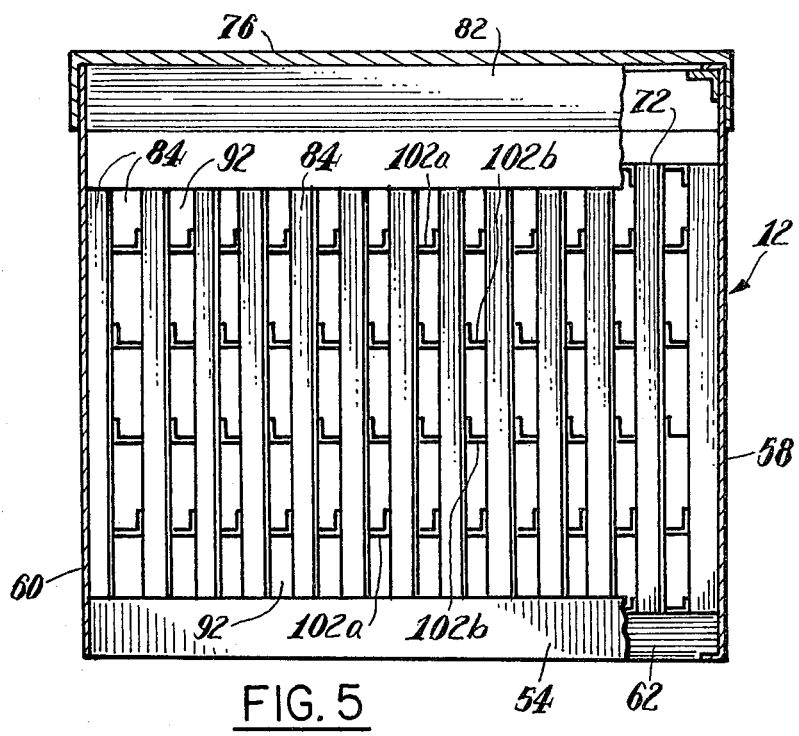
FIG. 5 is an end view of the machine shown in FIGS. 3 and 4, which illustrates the heat exchanger thereof in greater detail.
Figure 7:
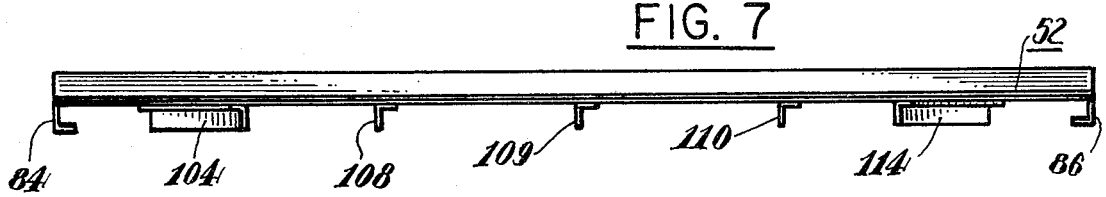
FIG. 7 is a plan view of the module shown in FIG. 6.
Figures 6, 8:
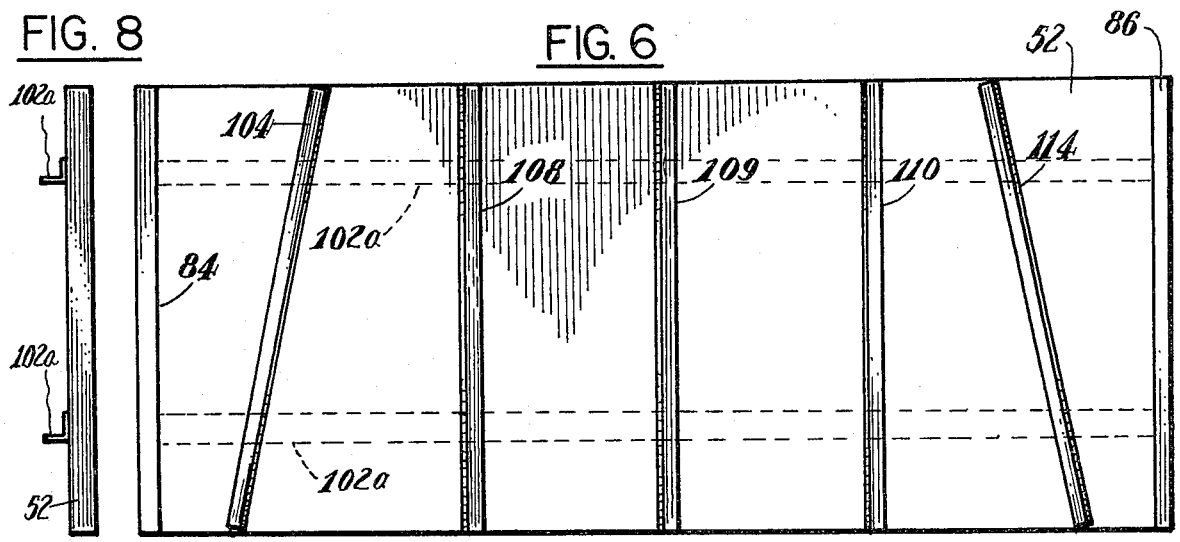
FIG. 6 is an elevational view of one of the modules containing a plate and partitions which are used in the heat exchanger shown in FIGS. 3, 4 and 5.
FIG. 8 is an end view of the module shown in FIG. 6.
Figure 10:
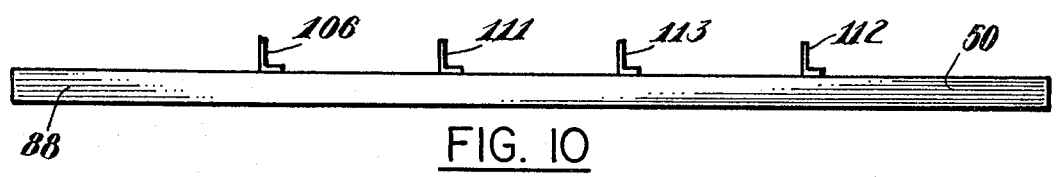
FIG. 10 is a plan view of the module shown in FIG. 9.
Figure 9:
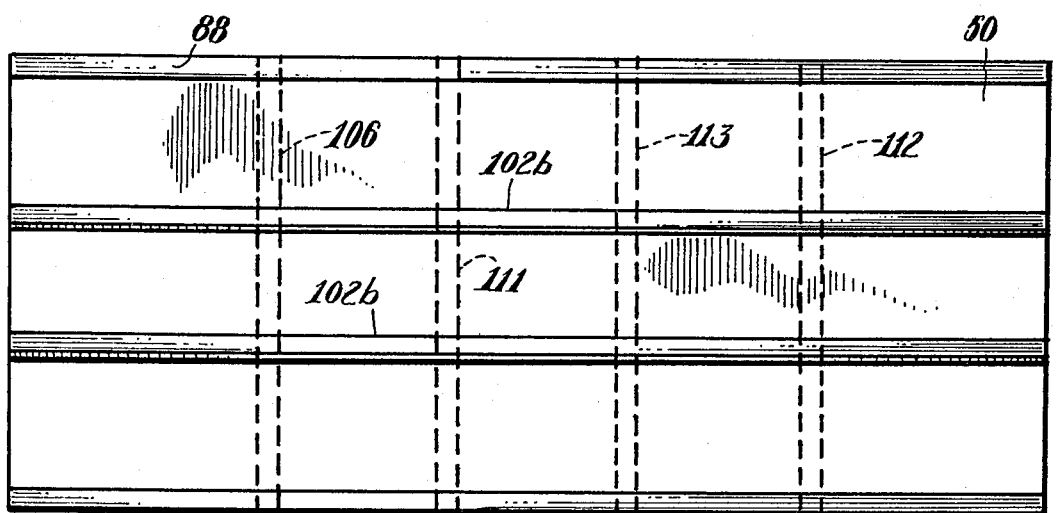
FIG. 9 is an elevational view of another module used in the heat exchanger shown in FIGS. 3, 4 and 5.
Figure 11:
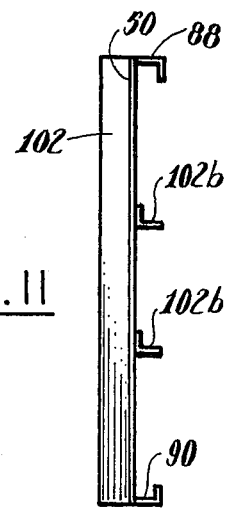
FIG. 11 is an end view of the module shown in FIG. 9.

Referring more particularly to FIGS. 3, 4 and 5, it will be seen that the heat exchanger unit 12 may in practice be made up of a large number of modules 50 and 52. The somewhat inclined orientation of the L-shaped partitions 104 and 114 at the right- and left-hand ends of the plates of the modules 52 provides for better distribution of the return air back to the opposite ends of the machine. The unit 12 may be constructed by laying out the bottom end plates 50 and 54 and attaching them to one of the side plates 58 to form a partially open framework. Then the modules are stacked with the first module which is disposed against the plates 58 being the type 52 having the vertical partitions. Such a module is shown in detail in FIGS. 6, 7 and 8. It will be noted from FIG. 3 that the first of these modules 52 which is disposed adjacent to side plate 58 does not have as many rows of vertical ducts and that the ducts are wider than in the case of the rest of the array. This is because additional vertical ducts are provided by partitions 106, 111, 113 and 112 of the modules 50 which are disposed adjacent to the modules 72. The design of these modules 50 is shown in detail in FIGS. 9, 10 and 11. Similarly, the modules 52 provide some of the partitions 102a along the upper and lower edges of the plates thereof. The remaining horizontal partitions 102b are located on the other modules 50. This relationship of partitions 102a and 102b is also observed in FIG. 5. The last module may be similar to a type 50 module but with a complete set of vertical partitions 104, 106, 111, 109, 113, 112, 110 and 114 on the same side thereof. The plate of the module then provides the side plate 60 of the heat exchanger unit framework.

In order to facilitate lifting and removal of the heat exchanger unit 12 brackets 124 may be welded at opposite corners of the framework. When lifting, the cover 76 is removed and the entire unit 12 is lifted up off the motor frame 14.

In assembling the baffle 82, it may be welded to the side plates 58 and 60 and at spots to the folded sections 88 of the modules 50 and to the upper edges of the plates of the modules 52. Accordingly, the entire heat exchanger unit provides an integral assembly of high structural integrity.

From the foregoing description, it will be apparent that there have been provided improved electrical machinery and particularly an improved totally enclosed electrodynamic machine having a heat exchanger unit which provides effective air-to-air cooling of the machines and which may be readily assembled at low cost. Variations and modifications of the herein describe machine, within the scope of the invention, will undoubtedly become apparent to those skilled in the art. Accordingly, the foregoing description should be taken as illustrative and not in a limiting sense.

I claim:

1. An enclosed air cooled electrodynamic machine comprising a frame housing said machine, said frame being open on one side thereof, a cross flow plate heat exchanger mounted on said frame on said one side thereof, partitions between alternate pairs of the plates in said heat exchanger defining a plurality of separate ducts having opposite ends, said ducts communicating at one of said opposite ends with the interior of said frame, a baffle disposed adjacent to the other opposite ends directing the flow of internal air in opposite directions through different ones of said ducts so that said internal air circulates through said machine and said heat exchanger where said internal air is cooled by external air passing through said heat exchanger in cross flow relationship with said internal air.

2. The invention as set forth in claim 1 wherein said heat exchanger has a housing, said housing defining a plenum in communication with said other of said opposite ends of said ducts, said baffle being disposed in said plenum.

3. The invention as set forth in claim 2 wherein said machine has opposite ends, pairs of said ducts each between a different pair of said alternate plates being in communication with said opposite ends of said machine, said baffle being disposed transversely to said plates for directing internal air from said machine from said plurality of ducts, other than said pairs of ducts to said pairs of ducts.

4. The invention as set forth in claim 3 wherein said separate ducts are disposed in an array with said pairs of ducts at opposite ends of said array, said baffle being a plate bisecting said array to divide the flow about equally between said pairs of ducts at one of said opposite ends of said array and at the other of said opposite ends of said array.

5. The invention as set forth in claim 4 wherein said housing for said heat exchanger defines another plenum between said plates and said open side of said frame, each of said ducts in said array other than said pairs of ducts being in communication with said other plenum.

6. The invention as set forth in claim 5 wherein said machine has a rotor and a stator separated by a gap, passages in said stator communicating said another plenum with said gap, and baffles in said frame communicating said pairs of ducts with said rotor at the opposite ends thereof.

7. The invention as set forth in claim 6 wherein said rotor has fan blades at the opposite ends thereof for directing the flow of internal air into said gap.

8. The invention as set forth in claim 7 further comprising other partitions between adjacent ones of said plates between said alternate pairs of plates which said other partitions are disposed generally perpendicularly to said partitions between said alternate pairs of plates to define channels for external air extending between the ends of said heat exchanger housing, said ends having openings communicating with said channels for the entry and exit of said external air.

9. The invention as set forth in claim 8 further comprising a third housing having an inlet opening and an exhaust opening and defining a passage for external air from said exit between said inlet and said exhaust opening thereof, said third housing extending across said heat exchanger and said frame, a fan connected to said rotor and extending externally of said frame into said third housing for impelling external air through said channels and third housing to said exhaust opening thereof.

10. The invention as set forth in claim 8 wherein said frame and heat exchanger housing are rectilinear in shape and they are approximately the same length and width.

11. An enclosed electrical machine having a body portion and portions at opposite ends of said body portion, said machine comprising a frame having walls in which said machine is disposed, means in said frame defining passages communicating the body portion and at least one end portion of said machine with one wall of said frame, a heat exchanger disposed on said one wall and having a plurality of plates defining a plurality of interleaved channels for the flow of external air and internal air of said machine in adjacent ones thereof, said internal air channels having means defining first and second ducts in each of said channels communicating at one thereof, through said one wall with said passages which communicate with at least one of said end portions and body portion of said machine respectively, and means at the ends of said first and second ducts opposite from said one end thereof for directing the internal air from said second to said first ducts whereby said internal air from said body portion of said machine circulates through said heat exchanger, is cooled therein by heat exchange with said external air, and circulates back to said machine at said one end portion thereof.

12. The invention as set forth in claim 11 wherein said external air channels are horizontally oriented and said internal air channels are vertically oriented, and said means at said opposite end of said ducts comprises a generally horizontally disposed plenum.

13. The invention as set forth in claim 12 wherein said first ducts are disposed in a first group and a second group, said second ducts are disposed in a third group, said first and second groups of ducts each being disposed on an opposite side of said third group, said first and second groups each being in communication at said one end thereof with a different one of said opposite end portions of said machine, said third group of ducts each at said one end thereof being disposed in communication with said body portion.

14. The invention as set forth in claim 13 wherein said means at said opposite ends of said ducts comprises a horizontally disposed baffle dividing said plenum with about half of said third group of ducts and said first groups of ducts at one side thereof and about the other half of said third group of ducts and said second group of ducts on the opposite side thereof.

15. The invention as set forth in claim 14 wherein said baffle is another plate which is vertically disposed at such an angle with said plates of said heat exchanger that the number of said third group ducts between said one side of said baffle plate and said first group ducts decreases while the number of said third group ducts between the opposite side of said baffle plate and said second group ducts decreases from one end of said baffle plate to the opposite end thereof.

16. The invention as set forth in claim 15 wherein said horizontal channels have external air inlets and outlets at opposite ends thereof, and means including an air impeller in communication with said outlet for drawing external air through said horizontal channels.

17. The invention as set forth in claim 1 wherein said heat exchanger is rectilinear in cross-section perpendicular to said plates, outer rows of ducts being disposed at opposite ends of said cross-section, said baffle extending diagonally across said cross-section between the ducts at the opposite ends of the rows adjacent to said outer rows of ducts.

18. The invention as set forth in claim 17 wherein said plates are disposed in a housing, said housing defining a plenum in communication with the ends of said ducts across which said baffle extends, said baffle also dividing said plenum into two chambers on opposite sides thereof.

19. The invention as set forth in claim 18 wherein the pairs of plates of different ones of said alternate pairs of plates which are adjacent to each other define channels therebetween, said housing having openings at the opposite ends of said plates in communication with the opposite ends of said channels to define passages transverse to said ducts for the flow of fluid in heat exchange relationship with the fluid in said ducts.

20. The invention as set forth in claim 19 further comprising partitions in said channels defining a plurality of second ducts therein generally perpendicular to said ducts in said array.

21. The invention as defined in claim 20 wherein a plurality of partitions which form said array ducts and a plurality of partitions which form said channel ducts are each attached to different ones of said plates to provide individual modules which form said ducts when said modules are assembled stacked together in side-by-side relationship to provide said heat exchanger.

* * * * *